(12) United States Patent
Kurien et al.

(10) Patent No.: US 8,718,323 B2
(45) Date of Patent: May 6, 2014

(54) BATCH DETECTION ASSOCIATION FOR ENHANCED TARGET DESCRIMINATION IN DENSE DETECTION ENVIRONMENTS

(75) Inventors: Thomas Kurien, Lexington, MA (US); Steven T. Cummings, Amherst, NH (US)

(73) Assignee: Raytheon Company, Waltham, MA (US)

( * ) Notice: Subject to any disclaimer, the term of this patent is extended or adjusted under 35 U.S.C. 154(b) by 266 days.

(21) Appl. No.: 12/907,383

(22) Filed: Oct. 19, 2010

(65) Prior Publication Data
US 2012/0093359 A1    Apr. 19, 2012

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 5,798,942 A * | 8/1998 | Danchick et al. | 342/96 |
| 7,397,415 B1 | 7/2008 | Wang et al. | |
| 2002/0008657 A1 * | 1/2002 | Poore, Jr. | 342/96 |
| 2006/0284755 A1 | 12/2006 | Sirois | |
| 2008/0150787 A1 | 6/2008 | Cummings et al. | |

OTHER PUBLICATIONS

Kubica, Large-Scale Multiple Target Tracking with Sparse Observations: Data Structures and Algorithms for Asteroid Tracking, Dec. 17, 2004, Robotics Institute Carnegie Mellon University.*

Sinev, Nick. 'Re: Tracker algorithm based on Hough transformation'. Santa Cruz Linear Collider Retreat, Jun. 29, 2002 [retrieved on Dec. 16, 2010]. Retrieved from the Internet: at http://scipp.ucsc.edu/~schumm/nlc/sc_retreat/sinev.pdf.
Peter E. Hart, How the Hough Transform Was Invented, IEEE Signal Processing Magazine, Nov. 2009, pp. 18-22.
D.H. Ballard, Generalizing the Hough Transform to Detect Arbitrary Shapes, Computer Science Department, University of Rochester, Rochester, NY 14627, U.S.A., Received Oct. 10, 1979; in revised form Sep. 9, 1980; received for publication Sep. 23, 1980, pp. 111-122.

* cited by examiner

*Primary Examiner* — Stephen R Koziol
*Assistant Examiner* — Raphael Schwartz
(74) *Attorney, Agent, or Firm* — Pierce Atwood LLP; Kevin M. Farrell

(57) ABSTRACT

The embodiments described herein relate to systems and techniques for processing batch detection information received from one or more sensors configured to observe objects of interest. In particular the systems and techniques are configured to enhance track performance particularly in dense target environments. A substantially large number of batch detections can be processed in a number of phases of varying complexity. An initial phase performs relatively low complexity processing on substantially all detections obtained over an extended batch period, approximating object motion with a simplified model (e.g., linear). The batch detections are divided and redistributed into swaths according to the resulting approximations. A subsequent phase performs greater complexity (e.g., quadratic) processing on the divided sets of detections. The subdivision and redistribution of detections lends itself to parallelization. Beneficially, detections over extended batch periods can be processed very efficiently to provide improved target tracking and discrimination in dense target environments.

18 Claims, 12 Drawing Sheets

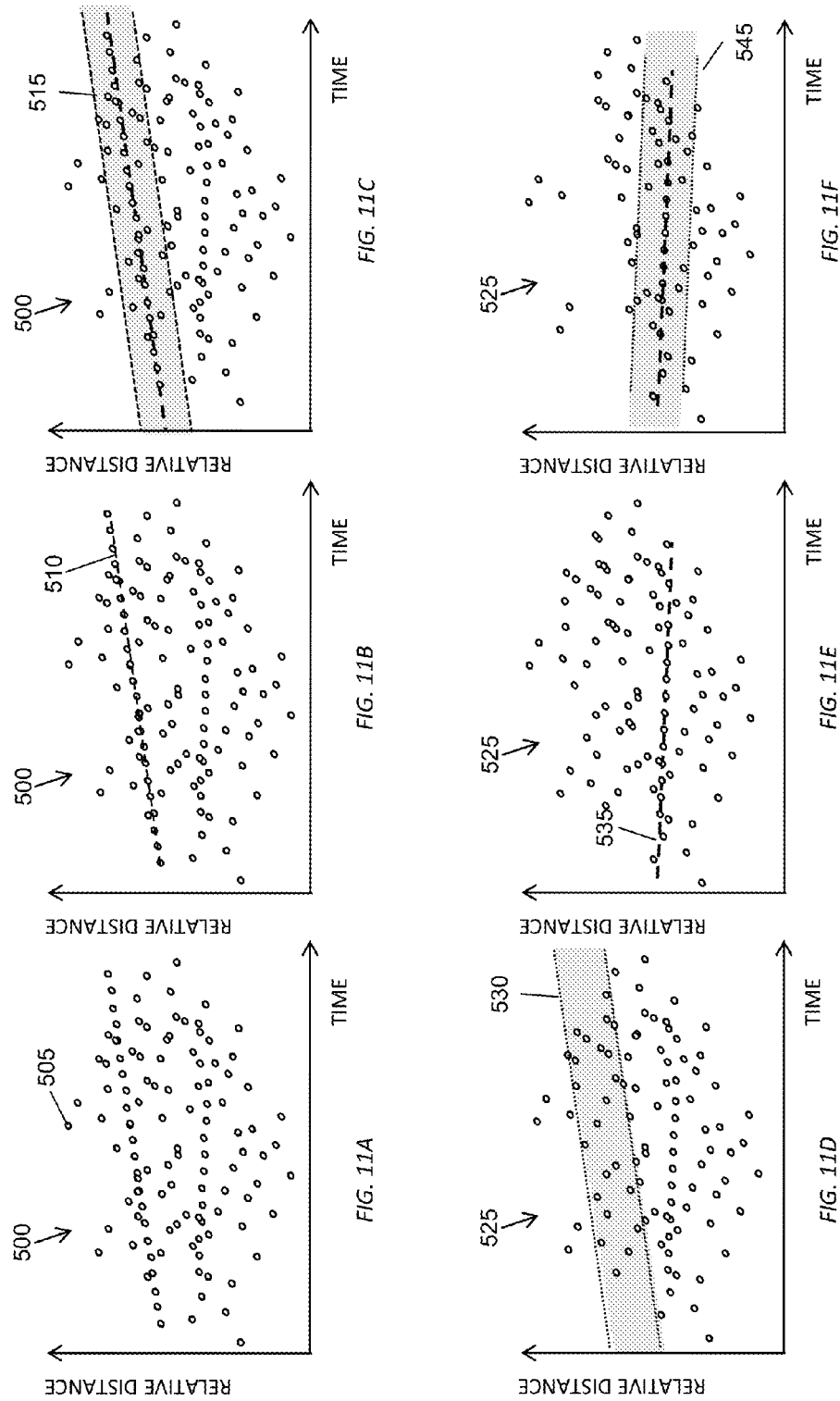

BATCH DETECTION ASSOCIATION FOR ENHANCED TARGET DESCRIMINATION IN DENSE DETECTION ENVIRONMENTS

TECHNICAL FIELD

Various embodiments are described herein relating generally to tracking for applications including radar systems, sonar systems and the like, and more particular to improved target tracking and discrimination in dense detection environments through batch detection processing.

BACKGROUND

Trackers receive sensor data and determine state vectors associated with detected objects in a search volume. Trackers are used in the real-time tracking of objects including air, surface and space targets. Some tracking scenarios include determining tracks for individual ballistic objects in a dense target environment. Situations where detection density is high, include solid fuel debris cloud environment observed with high-resolution X-band radars, and space debris, for example, associated with a debris cloud from a destroyed satellite. Other situations include, size of object larger than radar resolution (e.g., large objects observed with high-resolution X-band radars). Some situations include combination of above two situations.

One class of real-time trackers use an approach referred to as multiple hypothesis tracking (MHT). Multiple hypothesis trackers recursively process detection data, but associate detections for a relatively short period of time. For example, a multiple hypothesis tracker may rely on detections from two or perhaps three subsequent sensor sweep or sensor update cycles. Such approaches for tracking objects can increase precision through increased detection information in the batch interval. Unfortunately, such approaches are subject to a dramatic (e.g., exponential) increase in computational requirements when a relatively long batch of detections is used to formulate association decisions. Consequently, practical systems rely on relatively short batch periods to make association decisions. Such limitations results in poor performance when, for example, detection density is high, or object detection probability is small. Even greater computational requirements are necessary when objects have multiple scatterers.

SUMMARY

Described herein are embodiments of systems and techniques for processing batch detection information received from one or more sensors configured to observe objects of interest. In particular the systems and techniques are configured to enhance track performance particularly in dense target environments. In particular embodiments, a substantially large number of batch detections are processed in a number of stages or phases of varying complexity. An initial phase performs relatively low complexity processing on substantially all detections obtained over an extended batch period, to a simplified model of object motion. The batch detections are divided and redistributed according to the simplified model of object motion. The divided subsets can extend over an entire batch period. A subsequent phase performs greater complexity processing on the divided sets of detections. The subdivision and redistribution of detections lends itself to parallelization. Beneficially, detections over extended batch periods can be processed very efficiently to provide improved target tracking and discrimination in dense target environments.

In one aspect, at least one embodiment described herein supports a process for use in tracking physical objects of interest within a search volume. More particularly, the process comprises receiving multiple detections obtained during a surveillance period from at least one sensor monitoring at least one target moving along a respective discernable trajectory. A respective linear approximation is identified for at least one of the respective discernable trajectories. A respective first subset of the plurality of detections is associated with each of the respective linear approximations. For each of the associated first subsets, a respective quadratic approximation is identified for the respective discernable trajectory. For each of the associated first subsets, a respective second subset of the plurality of detections is associated with each of the respective quadratic approximations. In some embodiments, identifying each respective linear approximation includes applying a linear Hough transformation.

In another aspect, at least one embodiment described herein relates to a system configured for providing enhanced tracking of moving targets in a dense detection environment. The system includes a memory configured to store multiple detections obtained during a surveillance period. The detections are obtained from at least one sensor monitoring at least one target moving along a respective discernable trajectory. The system also includes a first identification module in communication with the memory. The first identification module is configured to identify a respective linear approximation of each of the respective discernable trajectories. A first association module is in communication with the memory and the first identification module. The first association module is configured to associate a respective first subset of the plurality of detections with each of the respective linear approximations. A second identification module is in communication with at least the first association model. The second identification module is configured to identify for each of the first subsets, a respective quadratic approximation of the respective discernable trajectory. The system also includes a second association module in communication with the memory and the second identification module. The second identification module is configured to associate further, for each of the associated first subsets of the multiple detections, a respective second subset of the detections with each of the respective quadratic approximations.

In yet another aspect, at least one embodiment described herein relates to a system for enhancing tracking of one or more physical objects of interest within a search volume. The system comprises means for receiving a plurality of detections obtained during a surveillance period from at least one sensor monitoring at least one target moving along a respective discernable trajectory. The system also includes means for identifying a respective linear approximation of at least one of the respective discernable trajectories, means for associating a respective first subset of the plurality of detections with each of the respective linear approximations, and means for identifying for each of the associated first subsets, a respective quadratic approximation of the respective discernable trajectory. The system further includes means for associating further, for each of the associated first subsets, a respective second subset of the plurality of detections with each of the respective quadratic approximations.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 11A through FIG. 11F graphically illustrate a particular embodiment of processing an example of batch detections.

DETAILED DESCRIPTION

A description of preferred embodiments of the invention follows.

The examples described herein are directed to the simultaneous processing of multiple detections obtained from a sensor over a substantial period of time compared to the sensor update cycle, to improve target tracking and discrimination in dense detection environments. In particular embodiments, a substantially large number of batch detections are processed in multiple stages or phases of varying complexity. An initial phase performs relatively low complexity processing on substantially all detections obtained over an extended batch period, to approximate a simplified object motion. The batch detections are divided and redistributed according to the approximated simplified object motion. The divided subsets can extend over an entire batch period. A subsequent phase performs greater complexity processing on the divided sets of detections.

Figure 1:
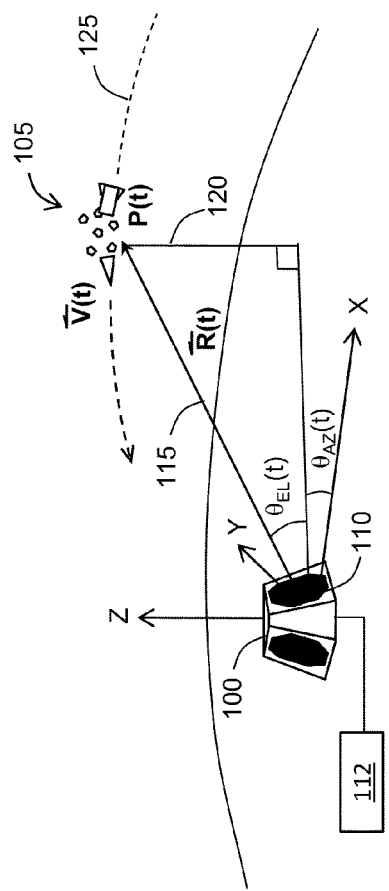
FIG. 1 illustrates a particular embodiment of a sensor system.

FIG. 1 illustrates a particular embodiment of a sensor system configured for detecting the presence of one or more objects within a search volume. In at least some embodiments the sensor system 100 receives a signal indicative of the presence of the one or more objects present within a search volume. For example, the sensor system 100 can be a radar system having a transmitter portion and a receiver portion. The transmitter portion directs energy into the searched volume. A portion of the energy interacts with one or more objects 105 in the search volume, causing a fraction thereof to be returned to the receiver portion. The receiver provides an output signal including a detection indicative of the returned energy received from the object 105. In at least some embodiments, the sensor system (e.g., radar) 100 includes a transducer configured for selectively directing transmitted energy into the search volume. As in the illustrative example, the transducer may include a steerable antenna 110.

Generally, the energy is directed towards the one or more objects 105 and scattered in various directions. A portion of the scattered energy is returned along a respective line defined between the sensor system 100 and each of the one or more objects 105. Position or location of the one or more objects 105 within the search volume can be identified with respect to a reference, such as the location of the transducer 110. For example, positions P can be defined in three-dimensional space according to any suitable coordinate system, such as Cartesian coordinates (i.e., x, y, z), cylindrical coordinates (i.e., $\rho$, $\phi$, z), and spherical coordinates (i.e., r, $\theta$, $\phi$). In the illustrative example, the one or more objects 105 are located at a distance 115 or range R, at a bearing or azimuth angle $\phi_{AZ}$, measured from a reference (e.g., North, or boresight of an antenna array), and at an elevation angle $\theta_{EL}$, measured from a reference plane (e.g., ground). The elevation angle and distance correspond to an object height 120 above the reference plane (e.g., ground). Distance R can be determined according to the well-known radar range equation, whereas azimuth and elevation angles can be determined from antenna direction.

Figure 2:
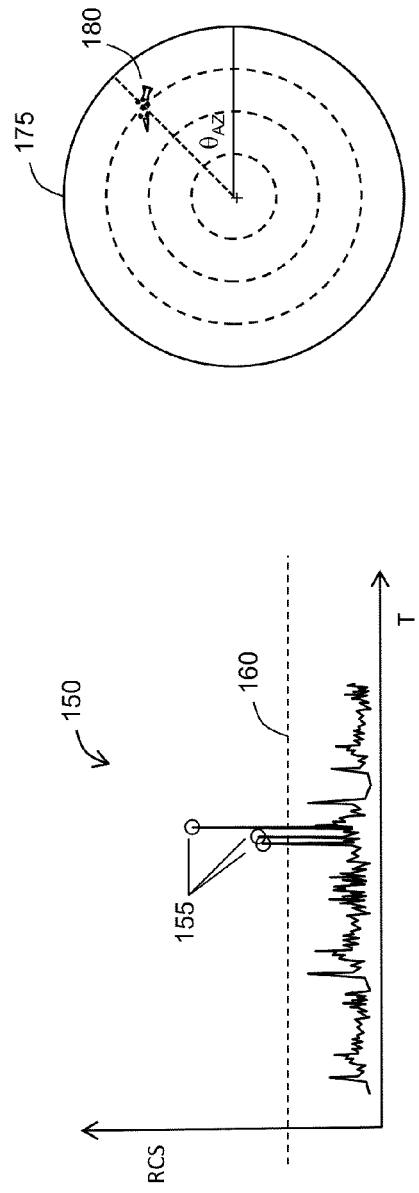
FIG. 2 illustrates a graphical representation of an example of an output signal generated by a sensor system, such as the sensor system illustrated in FIG. 1.

FIG. 2 illustrates an example of a graphical representation or plot of an output signal 150 generated by a sensor system, such as the sensor system 100 illustrated in FIG. 1. In this example a sensor output signal provides a measure of energy versus time as may be returned from the one or more objects of interest 105 (FIG. 1). For radar systems, one such measure of energy returned from an object 105 can be referred to as its radar cross section, e.g., a measure of how detectable an object is by the radar. Objects 105 may represent vehicles (e.g., air, ground, space, marine), structures, people, creatures, or other objects monitored or detected by the sensor system 100. In the example plot 150, the radar return, or cross section, is plotted versus time. The time corresponds to a delay measured between a signal transmitted by the sensor (e.g., a radar pulse) and a signal received by the sensor system 100 (e.g., an echo returned from the one or more objects 105), the associated times being indicative of respective distances between the objects 105 and the sensor 100. In this example, the output signal includes multiple peak radar-cross-section measurements 155. In some embodiments, a detection threshold 160 can be defined to differentiate or otherwise distinguish peak radar-cross-section measurements 155 from the rest of the output signal (e.g., noise).

Figure 3:
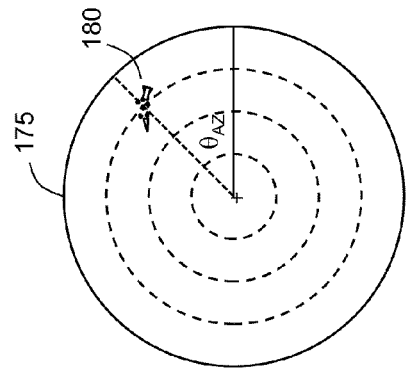
FIG. 3 illustrates an example of a graphical presentation of output signals obtained from a sensor system, such as the sensor system illustrated in FIG. 1.

Output signals 150 can be respectively obtained for different directions within a search volume. For example, output signals can be obtained periodically as the antenna 110 is swept in one or more of azimuth and elevation angles. The resulting output signals can be combined, for example, and displayed graphically to portray relative direction to and extent of one or more objects 105. FIG. 3 illustrates an example of a graphical presentation or plot of output signals obtained from a sensor system, such as the radar system 100 illustrated in FIG. 1. For example, radar cross section measurements 155 above the threshold 160 (FIG. 2) can be presented as an image 180 in the polar plot 175. In this example, the image 180 is positioned to have a radial distance corresponding to a range from the sensor 100 to the object of interest 105 (FIG. 1), and a bearing corresponding to an azimuth angle $\theta_{AZ}$.

As some objects are moving, the object's respective position varies as a function of time, P(t). A sensor 100 can be configured to repeatedly scan a search volume (e.g., several times per minute), providing updated positions with respect to time. Each scan of a given search volume can be referred to as a sweep and the time between such successive sweeps as a sweep time. Thus, the same search volume will be revisited periodically by the sensor according to a sensor update cycle. Accordingly, the graphical representation 175 will be updated periodically as the antenna 110 of the sensor 100 repeats its scan of the search volume. Thus, image(s) 180 corresponding to the one or more objects 105 (FIG. 1) may appear to move over a substantial period of time compared to the sensor update cycle (i.e., sweep time) according to updated detections obtained from the same object 105.

Traditional track processors (e.g., multiple hypothesis trackers) can be configured to monitor sensor output signals 150 (FIG. 2) over consecutive update cycles and to determine detections in these update cycles belonging to the same object 105. Such associations of multiple detections with a respective object can be referred to as "tracks." Resulting tracks can include some form of track identifier, or name, along with track-related information. Track-related information can include, for example, kinematics information (e.g., position, bearing, speed) related to the respective object of interest 105. Such information can be represented in a respective state vector for each object 105. State vectors may include kinematics information, for example, up to six degrees-of-freedom including position (e.g., x, y, z) and velocity (e.g., $V_x, V_y, V_z$). Alternatively or in addition, the state vector, depending upon sensor resolution and relative object size, may include other degrees of freedom, such as pitch, roll and yaw.

Sensor system 100 configurations include, for example, bistatic radars, continuous-wave radars, Doppler radars; FM-CW radars, monopulse radars, passive radars, planar array radars, pulse-Doppler radars, synthetic aperture radars, synthetically thinned aperture radars. Sensor systems 100 configurations particularly suited for searching include, for example, Early Warning (EW) radar systems, Ground Control Intercept (GCI) radars, Airborne Early Warning (AEW) radars, Airborne Ground Surveillance (AGS) radars, Over-the-Horizon (OTH) radars, Target Acquisition (TA) radar systems, Surface-to-Air Missile (SAM) systems, Anti-Aircraft Artillery (AAA) systems, Surface Search (SS) radar systems, surface search radars, coastal surveillance radars, Antisubmarine Warfare (ASW) radars, and gap filler radar systems.

Examples of sensor systems 100 include, but are not limited to, video and still cameras, motion detectors, radar systems, Electro Optical/Infrared (EO/IR), Infrared Search and Track (IRST), Doppler, sonar receivers, infrared detectors, seismometers, thermal-imaging systems, and x-ray imaging systems. More generally, however, sensor systems 100 can represent any appropriate combination of hardware, software, and/or encoded logic suitable to provide the described functionality. The sensor systems 100 can couple to an information processor 112 through a dedicated connection (wired or wireless) or can connect to the information processor 112 only as necessary to transmit detections.

A detection includes information obtained or otherwise derived from an output signal 150 of a sensor system 100 that is representative of an object 105. For example, a detection includes a time value t, a radar cross section RCS, a range or distance R, and associated azimuth and elevation angles $\theta_{AZ}$, $\theta_{EL}$. The time value t corresponds to a time the detection was obtained, a time the sensor transmit signal (e.g., radar pulse) responsible for the detection was transmitted, or some other suitable reference. In some embodiments, the radar cross section value is used to declare a particular radar return a detection if the RCS value is above an established threshold. In such instances, detections may not include the RCS value, e.g., detection=(t, R, $\theta_{AZ}, \theta_{EL}$). Rather, in a binary sense, the mere recording of the detection suggests that the associated RCS was above a detection threshold. Of course the position, e.g., P=(R, $\theta_{AZ}, \theta_{EL}$) may be referenced or otherwise transformed to any suitable coordinate system, e.g., P=(x, y, z).

The processes and systems described herein can be distinguished from typical tracking systems in that associations between multiple detections are determined by simultaneously processing detections obtained from a sensor over a substantial period of time compared to the sensor update cycle (or sensor revisit period). Such detection samples are referred to as "batch" detections. Batch detections are obtained from the sensor system over a batch period, which is greater than the sensor revisit period. Consequently, a batch period may include more than one detection from the same object obtained during different sweeps by the sensor system of the search volume. A batch period includes more than one revisit period (e.g., the previous period, the current period, and the next period). In some embodiments, a batch period is greater, for example, including more than ten revisit periods. In other embodiments, the batch period includes more than fifty or a hundred or even more revisit periods. In some embodiments, the batch period is configurable, for example, according to available data, processing time, user preference, etc.

Observations of radar returns from the same objects over the many sensor revisits within a batch period can be particularly helpful when the detection density is high. From a single sensor revisit period (or a few such periods), it may be extremely difficult if not impossible to reliably associate detections of such a high-density scenario with respective tracks. The clustering of such detections would likely lead to some confusion in associating tracks of successive sweeps. Beneficially, the techniques illustrated by the examples described herein allow for more reliable track association through processing of the high-density detections obtained over the relatively large number of sweeps in the batch period. For example, other features observable over the batch period, such as relative motion of the detections can be used to better associate detections with the same object leading to more reliable tracks.

Figure 4:
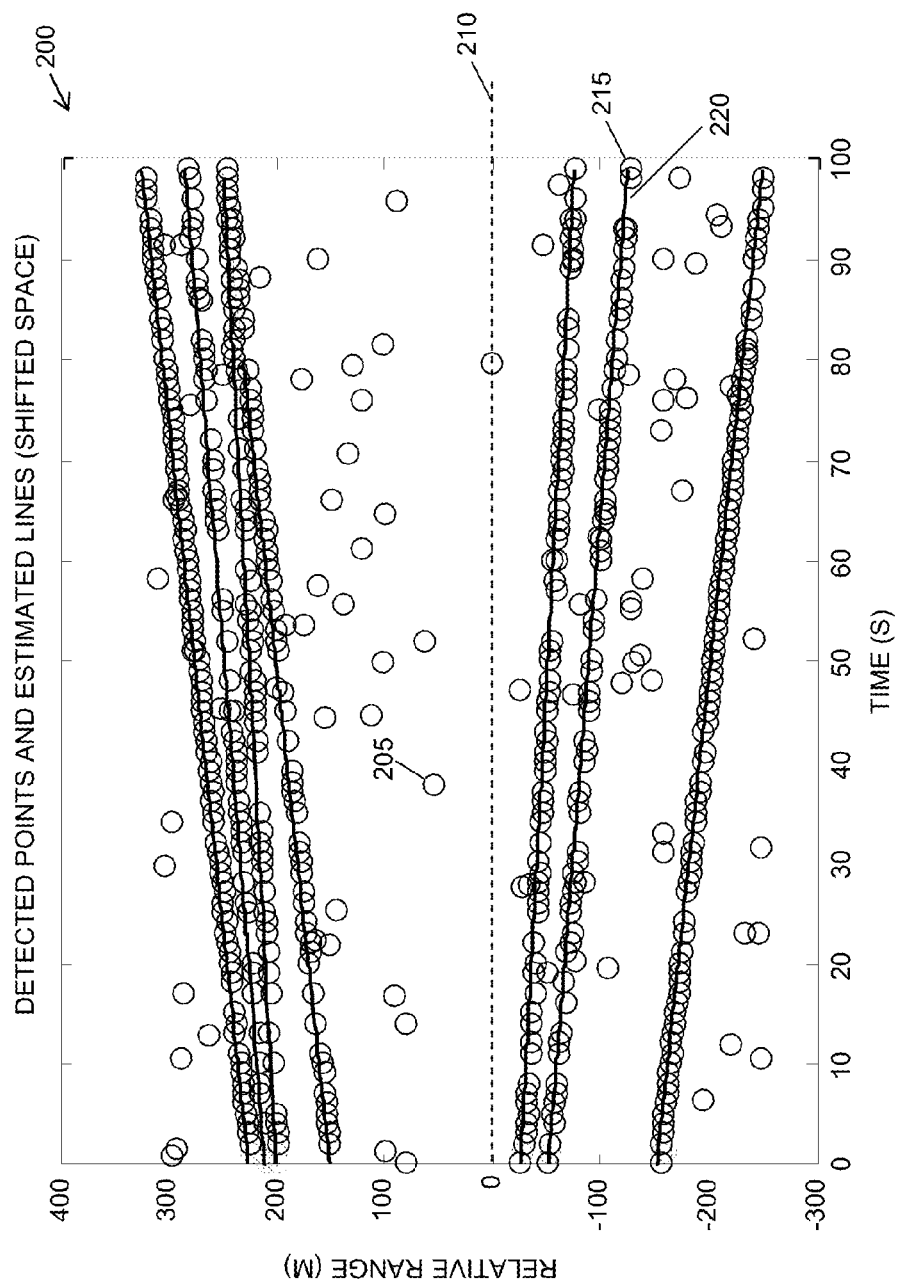
FIG. 4 illustrates a graphical representation of an example of batch detections determined from output signals of a sensor system, such as the sensor system illustrated in FIG. 1.

FIG. 4 illustrates a graphical representation of an example of batch detections determined from output signals of a sensor system, such as the sensor system 100 illustrated in FIG. 1. Batch detection data includes multiple detections 205 appearing as small circles. The batch detections 205 are illustrated as a plot 200, represented as circles positioned along coordinate axes. A vertical axis, for example, corresponds to a distance. In the illustrative example, the distance is a relative range, to some reference that may be stationary or moving as will be described further below. In this instance, the reference range to which all relative ranges are measured is represented by the dashed horizontal line 210. A horizontal axis corresponds to time. In this example, time is represented in seconds, extending for the batch sample period—i.e., from 0 to 100 seconds.

When plotted in this manner, each of the detections 205 has a respective relative range and sample time (R, t). A single sweep or update cycle of the search volume by the sensor, or radar in this instance, that produced the detections, may have been on the order of 1 sweep per second. Thus, up to 100 separate sweeps of the search volume may have occurred during the 100 second batch period. An object within the search volume may produce at least 1 detection for each sweep (i.e., up to 100 detections in the same batch corresponding to the same object, presuming it remains within the search volume over the batch period). When simply plotted in this manner, it is not necessarily apparent whether the detections 205 have any particular association. Each of the detections 205 appears as an independent circle on the plot 200. It is possible, and quite probable that at least some of the multiple detections relate to the same object observed at respective ranges that may vary throughout the batch period.

In the illustrative example, it is apparent by visual inspection of the batch plot 200 that at least some of the detections 215 fall along a common curve, or line 220. In this instance, there appear to be at least about seven such lines. Each of the lines may represent relative motion of a respective object throughout the batch period. As the objects move, updated detections are obtained by the sensor system. When a collection of such detections are plotted over a batch period, they tend to reflect motion of the object during the batch period. Some detections of an object may not appear during some sweeps in the batch interval due to variation in radar cross section, interference, and various other reasons. Likewise, more than one of the detections may appear during the same sweep time depending upon sensor resolution, object size, etc.

Figure 5:
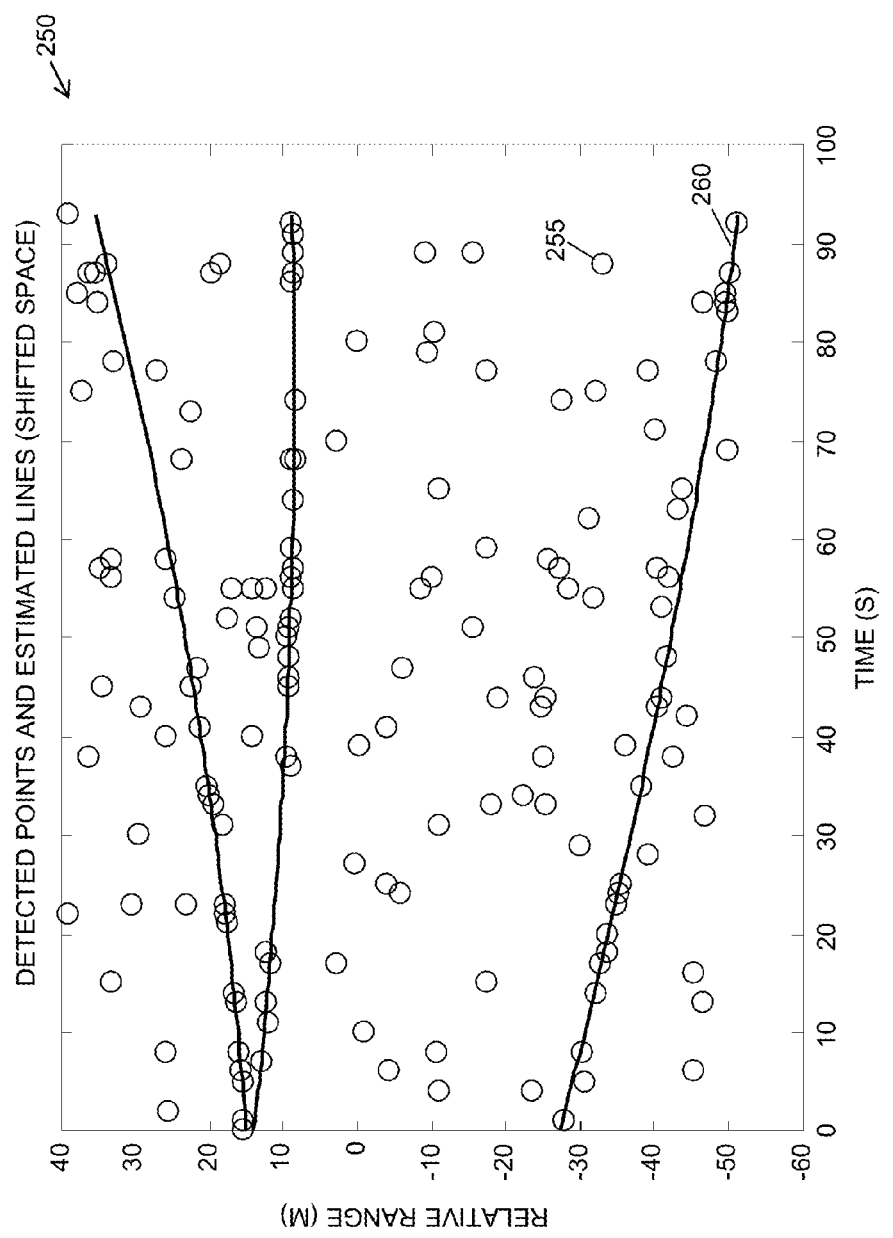
FIG. 5 illustrates a graphical representation of another example of batch detections determined from output signals of a sensor system, such as the sensor system illustrated in FIG. 1.

Depending upon the particular detections, the existence of such curves or lines may not be so readily apparent. FIG. 5 illustrates a graphical representation of another example of a batch detection plot 250 over a similar, 100 second batch period. The sweep time employed by the sensor system producing the detections may also be similar (i.e., 1 sweep/second). The individual detections 255, although still numerous, are relatively sparse compared to the previous example. It is not so readily apparent, however, which detections 255, if any, fall along a common line or curve 260. Nevertheless, in the illustrative example, at least three such lines or curves 260 can be drawn through the batch detections, indicating the presence of perhaps at least three separate objects. A systematic approach to determining associations of detections over a batch sample period is described below.

By its nature, batch processing relies upon a collection of detections of a common search volume obtained over an extended period of time. Determining an association of multiple detections with a common object requires that there be multiple observations or detections of the same object available over an extended period of time. In at least some embodiments detections within individual sweeps are stored over multiple consecutive sweeps, resulting in a stored collection of detections representing the batch detections.

Figure 6:
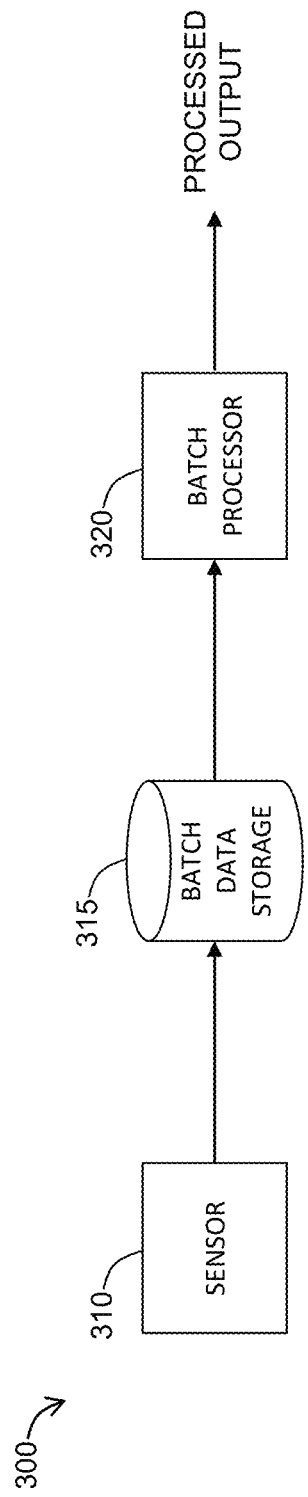
FIG. 6 illustrates a block diagram of a particular embodiment of a sensor system configured for batch-detection processing.

FIG. 6 illustrates a block diagram of a particular embodiment of a sensor system 300 configured for batch-detection processing. The sensor system includes at least one sensor 310, batch data storage 315 and at least one batch detection processor 320. The batch detection processor 320 obtains batch detection data from batch data storage 315 for processing as described herein. The sensor 310 can be any suitable sensor, such as those described herein for obtaining observations of an object in a search volume. The observations are collected and stored, at least temporarily, in the batch data storage 315. Batch data storage 315 can be any suitable storage device, such as electronic memory, e.g., random access memory (RAM), magnetic media, such as hard disk drives, optically readable memory, such as CDROMs, or an optical storage disk configured for reading, writing, and/or erasure.

The batch data storage 315 can be configured as part of the sensor system 100 (FIG. 1), or separate from the sensor system 100. For example, the batch data storage 315 can include a local memory device included within the sensor system 100, or a separate memory device that may be collocated with the sensor system 100 or remotely located. In some embodiments, the batch data storage 315 is in communication with the sensor system 100 through a network (i.e., networked storage). Alternatively or in addition, the batch data storage 315 can be collocated with the batch detection processor 320. When collocated with the batch detection processor 320, it is possible for the batch data storage 315 to be memory of the batch detection processor 320 (e.g., RAM, hard disk).

The batch data storage 315 can be configured for storage of the sensor output in a so-called "raw" format, for example, including the actual RCS type return plots of FIG. 2, the plots of FIG. 3, or other suitable numeric representation, such as a table. In at least some embodiments, batch data storage 315 includes an array, table, or suitable database of detections including for each detection an associated time and location (relative, absolute, or both). In some embodiments, batch data storage 315 is configured to store additional information related to the detections, such as a detection identifier or tag, weather conditions, sensor configuration, etc.

Figure 7:
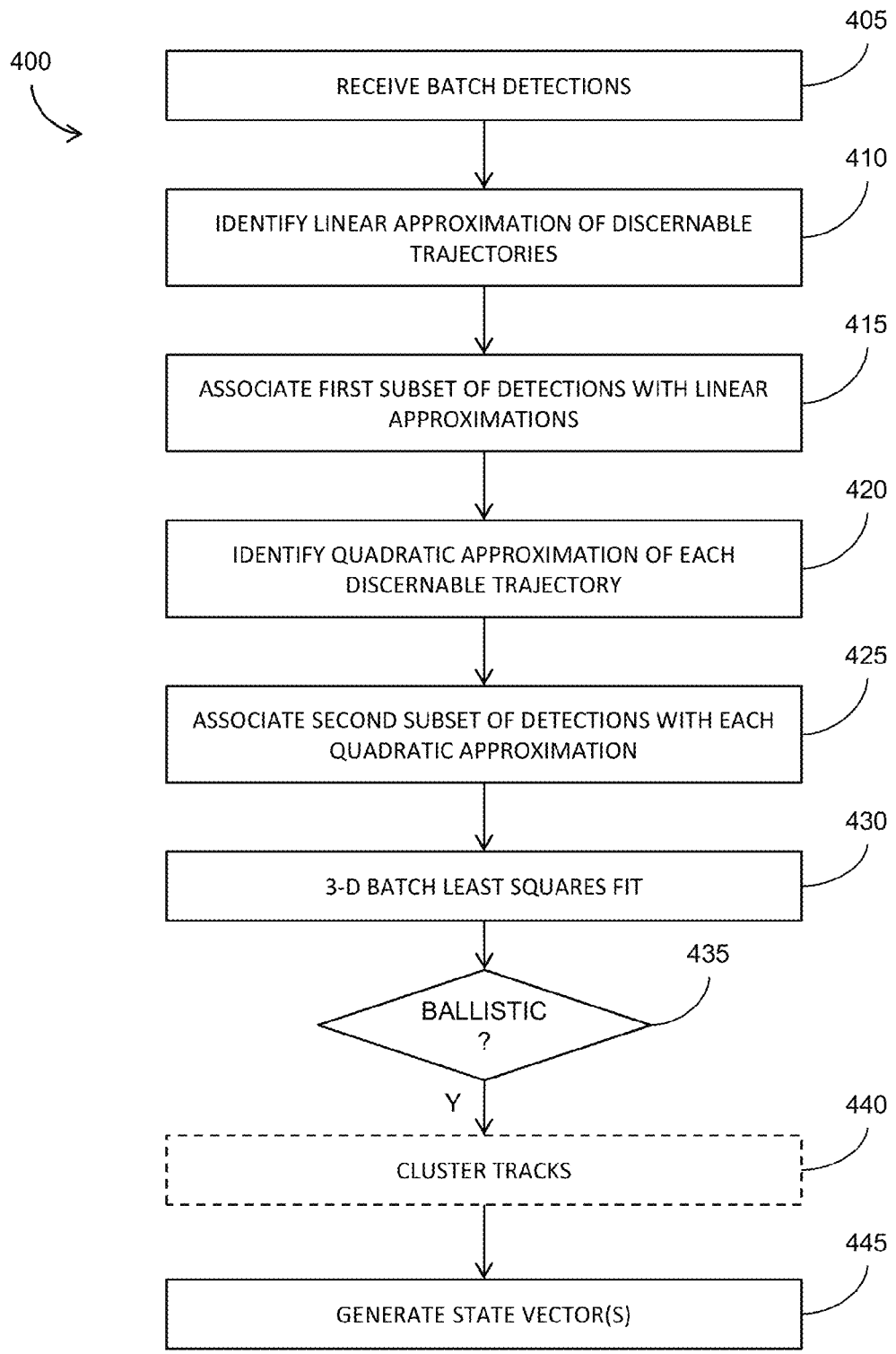
FIG. 7 illustrates a flowchart detailing an example operation of a particular embodiment of a process for determining an association of batch detections obtained from a sensor system, such as the sensor system illustrated in FIG. 1.

FIG. 7 illustrates a flowchart detailing an example operation of a particular embodiment a process for determining an association of batch detections obtained from a sensor system, such as the sensor system 100 illustrated in FIG. 1. The batch detection process 400 includes initially receiving batch detections at 405. The batch detections may be stored and later obtained, for example, from the batch data storage 315 (FIG. 6). As an initial approximation of object trajectories or tracks, one or more linear approximations of discernable trajectories are identified from the batch detections at 410. In particular, the batch detections are processed substantially simultaneously to identify a first subset of detections associated with a respective linear approximation. The first such subset of detections substantially falling along a common straight line is associated with the respective linear approximation at 415. For example, the detections may be stored separately in an array. Alternatively or in addition, an additional reference can be added to the stored detections to indicate their association with the linear trajectory. The batch detections can be further processed substantially simultaneously to identify subsequent subsets of detections associated with respective linear approximations.

By way of refinement, a quadratic approximation of each discernable trajectory is obtained at 420. Preferably, one or more such quadratic approximations can be obtained for each linear approximation obtained at 410. A second subset of detections associated with each quadratic approximation is identified at 425. For example, the detections substantially lying along the quadratic trajectory, which may be the same or different detections than those associated with the linear approximation, are associated during the quadratic refinement at 420. For example, the detections may be stored separately in an array. Alternatively or in addition, an additional reference can be added to the stored detections to indicate their association with the quadratic trajectory. The batch detections can be further processed substantially simultaneously to identify subsequent subsets of detections associated with respective quadratic approximations.

A curve can be fitted to the associated subset of detections for each quadratic approximation. At least one approach for approximating such curves includes fitting by way of least squares approximation at 430. In at least some embodiments, the subset of detections are referenced to their 3-D locations. This can be accomplished, for example, by re-introducing or otherwise associating detection data that may have been ignored or otherwise referenced for simplification of the preceding steps. Accordingly, the fitted curve corresponds to an approximation of a respective trajectory in 3-D space for each underlying object.

With associations of the batch detections so determined, there is a possibility that some of the associations may belong to a common object. It is desirable therefore to make a determination as to whether this may be the situation, such that one representative association can be determined for each object. At least one approach includes clustering different associations, or tracks that belong to a common object at 440. The associated step is shown in phantom suggesting that it is optional, for example, being included to enhance performance. Such clustering may be accomplished according to relative proximities of the detections associated with different quadratic approximations (distance between quadratic trajectories), relative velocities, and more generally, relative motion between the different associations of detections. For example, if two tracks remain relatively close throughout the batch period, there is a possibility they were obtained from different groups of detections from a common object.

Having determined such associations of batch detections and respective 3-D trajectories, respective state vectors can be determined at 445. State vectors can include, for example, position (e.g., x, y, z) and velocity (e.g., $v_x$, $v_y$, $v_z$) for each tracked object.

In at least some embodiments, residuals are calculated and used to determine whether objects identified by such trajectories or state vectors are ballistic or orbital. Such residuals can be determined by a measure of departure of one or more individual detections of each quadratically associated detections to a respective approximated trajectory and/or state vector. In some embodiments, residuals can be further processed, for example, by statistical measures, such as determining one or more of a respective mean, standard deviation, and the like for each associated group of detections. Such measures can be compared to predetermined thresholds and determinations made as to whether the association can be declared ballistic or orbital at 435.

Any determination as to how close the tracks need to be for clustering generally relates to resolution of the sensor system 100 and estimate of the size of expected objects. Accordingly, it will be more likely that there will be opportunities for track clustering for a high resolution radar tracking something substantially large compared to wavelength of operation of the sensor (e.g., size greater than half the wavelength, $\lambda/2$). For example, a portion of a rocket, such as its booster stage, may provide separate returns for the body and fins. In such an instance, if relative distance between tracks is less than a length of the booster stage, there may be an opportunity to cluster the tracks. The actual separation and velocity may depend on other factors, such as viewing angle (broadside, end-on), rotation of the object, etc.

Figure 8:
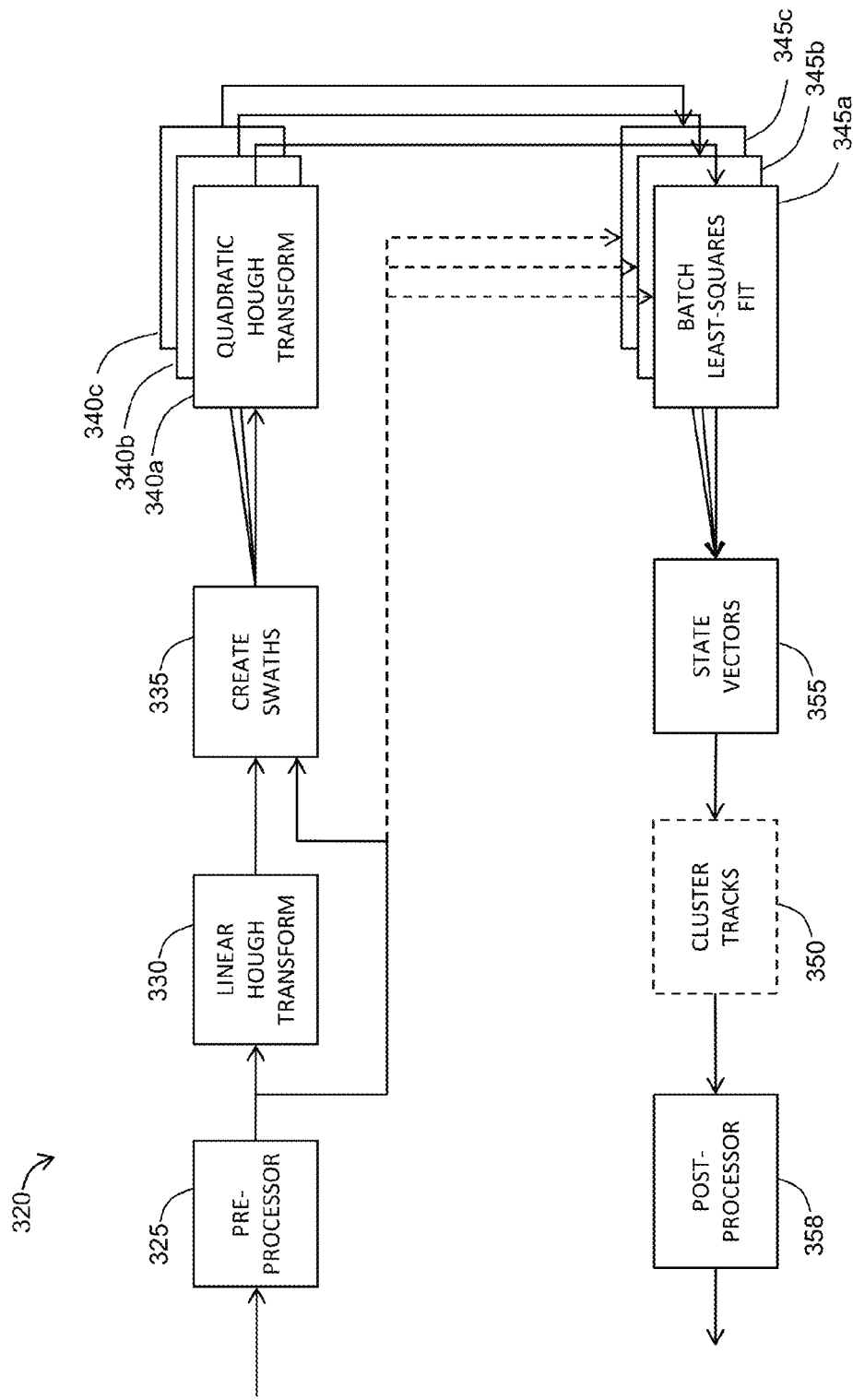
FIG. 8 illustrates, in more detail, a functional block diagram of a particular embodiment of a batch-detection processor.

FIG. 8 illustrates, in more detail, a functional block diagram of a particular embodiment of a batch detection processor 320. In at least some embodiments, the batch detection processor 320 includes a batch data preprocessor module 325. The batch detection processor 320 also includes a linear association or approximation module 330, a swath generation module 335, one or more quadratic approximation modules 340a, 340b, 340c (generally, 340), one or more data fitting modules 345a, 345b, 345c (generally, 345), and in at least some embodiments, optionally includes a track cluster module 350 (shown in phantom). Additionally, in at least some embodiments, the batch detection processor 320 also includes a state vector generation module 355, and/or a post processor 358. Exemplary operation of each module is discussed below, in turn.

When provided, the batch data preprocessor module 325 receives batch data compiled from a sensor, such as the sensory system illustrated in FIG. 1. In general, the preprocessor module 325 can be configured to provide manipulation of the batch detection data as may be necessary to make it better suited for further processing by the other modules. Examples of such preprocessing may include reformatting, scaling, alignment, etc.

By way of example, batch detections may represent objects traveling at very high speeds, or along a determinable trajectory (e.g., ballistic, or orbital). Although a suitable sensor system, such as the sensor system 100 illustrated in FIG. 1 may be configured to provide updated detections, variations in one or more of range, elevation, and azimuth may be substantial over a corresponding batch period. Accordingly, to render the batch detection data into a more suitable form in at least some embodiments, the detection data are adjusted for reference to an average speed. Since the preprocessed detection data are further processed to identify lines, preprocessing to make linear features more prominent may be desirable. One such approach includes referencing batch detection data obtained from a ballistic object to a ballistic trajectory. The ballistic trajectory is not linear; however, reference of a ballistic trajectory to a reference trajectory can be substantially linear. Of course, the projection of the relative trajectory onto the line-of-sight vector, i.e., the relative range will have small accelerations that would tend to depart from a straight line. Likewise, batch detection data can be referenced to an orbital trajectory for an orbital object, such as a satellite, asteroids, space debris, and the like.

The linear approximation module 330 receives preprocessed data from the preprocessor module 325, when provided, and provides an output indicative of such linear associations to the swath generation module 335. The linear approximation module 330 compares batch detections obtained from different sweeps (different respective times on the detection plot 200 (FIG. 4)), to estimate any groups of multiple detections that fall along a common straight line. Preferably, such comparisons are performed substantially simultaneously. At least one such transform that is well suited for automation is known as the Hough transform. The Hough transform operates on points, in this instance, detections, converting them to curves in $\rho$-$\theta$ space, such that linear associations can be readily determined.

The output of the linear approximation module 330 can include one or more straight lines that can be drawn through respective linear associations of detections. Preferably such straight lines can be identified according to a determined resolution in $\rho$-$\theta$ space. A relatively coarse resolution may be sufficient in many instances for this initial phase of processing—the detections don't necessarily fall exactly on the same straight line, but are relatively close to such a line. Such straight lines can be identified according to any suitable parametric representation, such as the corresponding $\rho'$, $\theta'$ in $\rho$-$\theta$ space, or other standard notation, such as point-slope, slope-intercept, point-point.

The swath generation module 335 receives the linear associations and, in at least some embodiments, also receives at least a portion of data from the batch data preprocessor module 325. The swath generation module 335 is configured to identify a respective swath of detections around each straight line identified by the linear approximation module 330. In some embodiments, a swath boundary is defined about each straight line identified by the linear Hough transform. Such boundaries include one or more straight lines parallel and spaced apart from a respective one of the detected lines. For example, an upper boundary can be defined at a distanced $d_U$ measured along a perpendicular drawn between the two parallel lines. A lower boundary can also be defined at a distance $d_L$ determined in a similar manner. In some embodiments, the upper and lower distances are substantially equal. Batch detections associated with a swath can be determined as those detections falling within the swath boundary. Alternatively or in addition, a respective distance measured from each of the detections (points) to a respective one of the one or more identified straight lines can be determined through well known mathematical techniques. If the distance is less than or equal to a swath boundary distance, the detection is identified as belonging to that swath. In at least some embodiments, it is possible for the same detection to be member of more than one swath.

Each of the one or more quadratic approximation modules 340 receives one or more respective swaths of detections from the swath generation module 335. In some embodiments, a single quadratic approximation module 340 respectively determines one or more quadratic approximations of associated detections in more than one swath of detections. Alternatively or in addition, more than one quadratic approximation modules 340 respectively determine one or more quadratic approximations of associated detections in a respective one of the swaths of detections. In at least some embodiments, each swath of detections is separately processed by a respective one of the one or more quadratic approximation modules 340.

Each of the one or more quadratic approximation modules 340 is configured to compare batch detections of a respective swath to estimate any groups of multiple detections that fall along a quadratic line. At least one such transform that is well suited for automation is known as the quadratic Hough transform. The output of the quadratic approximation modules 340 can include one or more quadratic lines that can be drawn through respective quadratically associated detections. Preferably such quadratic lines can be identified according to a determined resolution. A relatively fine resolution in transform space generally yields improved results for this subsequent phase of processing. Such quadratic lines can be identified according to any suitable notation, such as the generalized quadratic polynomial: $y=Ax^2+Bx+C$ for a ballistic trajectory or a generalized elliptical formula for an orbital trajectory: $x^2/a^2+y^2/b^2=1$.

In some embodiments, at least an initial phase of the processing by batch detection processor 320 is accomplished using simplified form of batch detection data. For example, processing up to and including the quadratic association module 340 described above can be accomplished for batch detection data including range, while ignoring associated azimuth and elevation information (at least some batch detection data may include range, azimuth and elevation angles defining a location in three-dimensional space). Further simplification for these initial phases of processing can be accomplished by referencing the detection date to a reference trajectory (e.g., to a ballistic model or to an orbital model, as the case may be). Thus, the range values used are measured relative to the corresponding ballistic or orbital model.

In some embodiments, a single data fitting module 345 determines a respective fitted curve for more than one of the quadratically associated detections received from the one or more quadratic approximation modules 340. Alternatively or in addition, given more than one data fitting module 345, each module 345 fits a respective curve to each of one or more quadratically associated detections received from one or more quadratic approximation modules 340. In at least some embodiments, each group of quadratically associated detections is separately processed by a respective one of the one or more data fitting modules 345.

The data fitting modules 345 determine a best fit curve in three-dimensional space through the detections associated with a respective quadratic line according to an established criterion. Preferably, the curve fitting is accomplished for the more complete detection data for those detections associated with a respective quadratic curve. Whereas the detection data may have been simplified for initial phases of processing, the detection data is restored to a three dimensional (3-D) representation. For example, the corresponding azimuth and elevation angles of each of the detections can be reintroduced, along with the range. Alternatively or in addition, the data can be de-referenced to whichever trajectory (e.g., ballistic, orbital) used to initially simplify the batch detection data.

The curve fitting can be accomplished using any suitable technique, such as well-known least squares fitting techniques. In at least some embodiments a nonlinear least squares curve fitting is used to identify a ballistic trajectory representative of a track of the quadratically associated detections. Such trajectory curves can be used to identify a state vector (e.g., position and velocity in 3-D) of the associated object responsible for the detections.

Each fitted 3-D curve represents a track associated with a respective detection, and thus to an object associated with the detection. Accordingly, the track may include position and bearing. In some embodiments, a state vector generation module 355 is provided to generate state vectors associated with such tracks, for example, determining additional track-related information, such as respective velocities. Velocities can be determined, for example, by calculating change in distance along a trajectory divided by the time value between detections. Such a velocity, when determined, can be included in the object's associated state vector (e.g., six degrees of freedom).

In some embodiments, the batch detection processor 320 includes a track cluster module. The track cluster module 350 further processes the tracks, enhanced or otherwise, to determine whether one or more of the tracks are associated with a common object. If so, the independent tracks can be replaced by a single track. The single track can be one of the two or more individual tracks, or some combination, such as a composite, of the two or more individual tracks. One such composite track includes an averaged position track determined as an algebraic average of the two or more tracks. Other composites may include further processing, such as filtering to remove detected rotation. Ultimately, the clustered tracks are available as output indicative of detected objects. In at least some embodiments, the output includes a respective state vector for each object. The state vectors may include six degrees of freedom (e.g., position (x,y,z) and velocity ($V_x$, $V_y$, $V_z$)).

In at least some embodiments, a post-processor 358 is provided. The post processor can be used, for example, to provide further refinement by way of error checking Namely, the post-processor 358 can determine residuals as measures between quadratically associated detections and their underlying trajectory or state vector. The post-processor 358 can determine whether such linear or quadratic associations of detections are reasonable, for example, by determining residuals and comparing them to a threshold. If the residuals are below the threshold, the post-processor 358 can reasonably conclude that the 3-D trajectory is a good approximation of object motion represented by the associated detections. By further determining that the 3-D trajectory is ballistic (i.e., the curve is a reasonable representation of a ballistic trajectory), it is possible with good agreement of the residuals to declare the underlying object as ballistic. Likewise, if the 3-D trajectory is orbital, it similarly possible to declare the underlying object as orbital.

Figure 9:
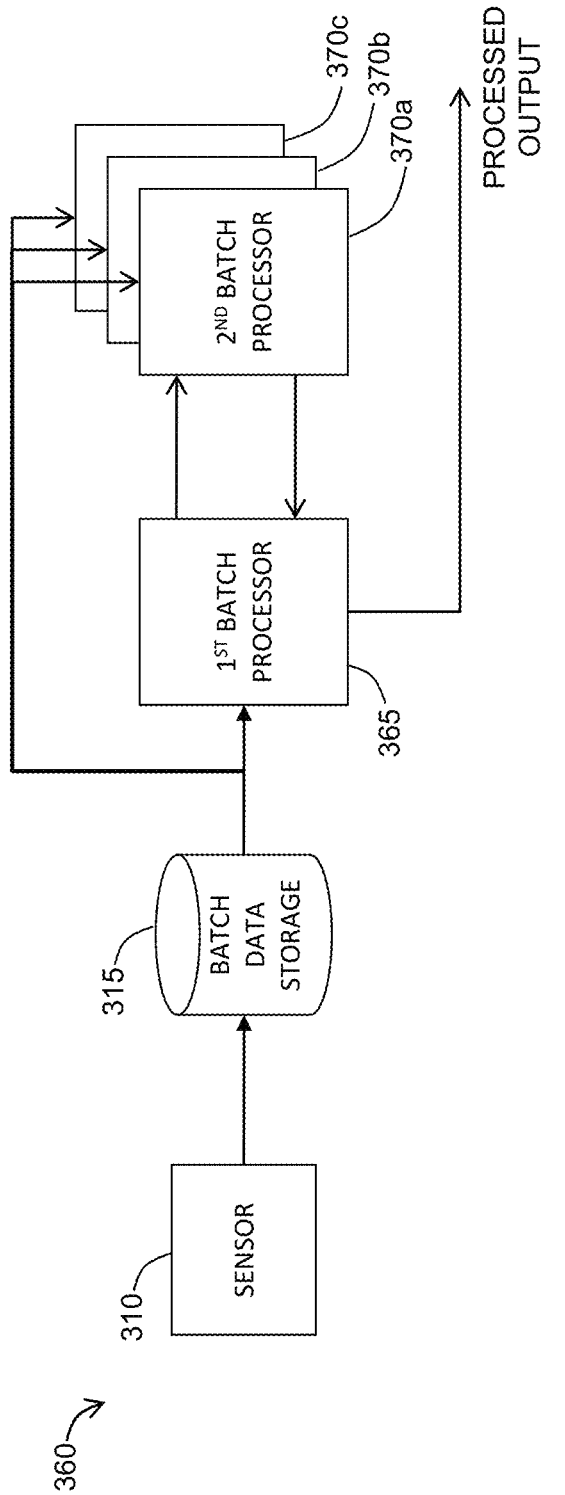
FIG. 9 illustrates a block diagram of an alternative embodiment of a sensor system configured for batch-detection processing.

As indicated above, at least some of the processing can be accomplished in parallel. Namely, the processing of each swath to determine quadratic associations can be accomplished in parallel for respective swaths of detections. Alternatively or in addition, the processing of each quadratic association to determine best fit trajectories in three-dimensional space can be accomplished in parallel for each detected quadratic curve. FIG. 9 illustrates a block diagram of an alternative embodiment of a sensor system 360 configured for batch-detection processing. In particular, the batch detection processor 320 includes a sensor 310 and batch data storage 315. The processor 360 also includes a first batch processor module 365 configured to process at least those portions of the process that may not be well adapted to parallelization. The batch detection processor 320 also includes one or more second batch processor modules 370a, 370b, 370c (generally 370) configured to process at least those portions of the process that are well adapted to parallelization. For example, one or more of the second batch processor modules 370 are configured to implement the quadratic Hough transform. Alternatively or in addition, one or more of the second batch processor modules 370 are configured to implement the least-squares fit.

Figure 10:
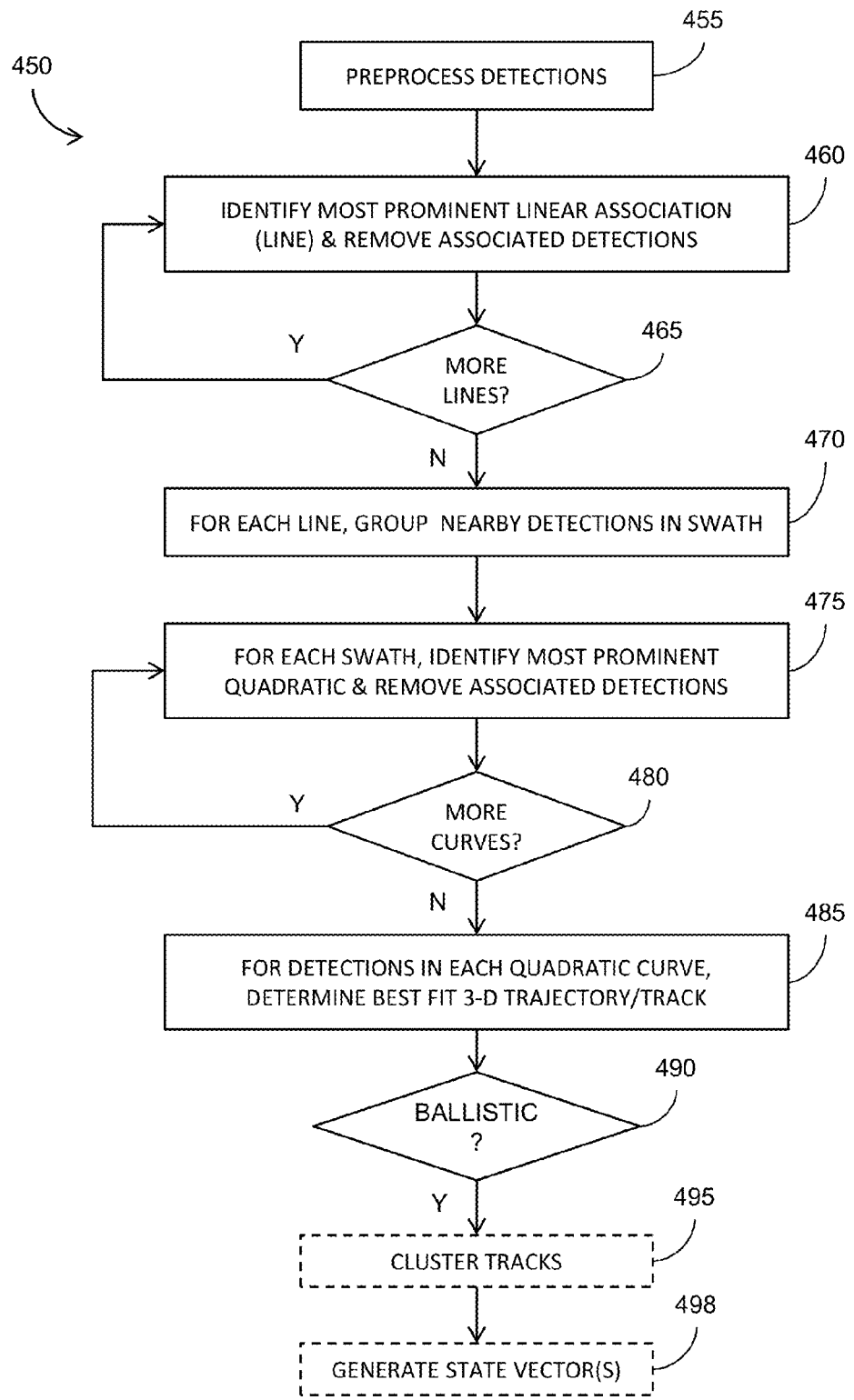
FIG. 10 illustrates in more detail a flowchart detailing an example operation of a particular embodiment of the batch detection process of FIG. 7.

FIG. 10 illustrates in more detail a flowchart detailing an example operation of a particular embodiment of the batch detection process of FIG. 7. The process 450 includes pre-process detections at 455. Next, the most prominent straight line association of the batch detections is identified at 460. Those detections associated with the most prominent straight line are removed from the batch detections being processed, resulting in modified batch detections. The next most prominent straight line association of the modified batch detections is identified at 460. Those detections associated with the next most prominent straight line are likewise removed, resulting in further modified batch detections. The linear association detection process is repeated until no more such associations are identified at 465. A minimum number of detections necessary to determine a straight line association can be established (e.g., ten detections). When the next most prominent straight line includes less than the threshold number of detections (e.g., 10), the process will proceed to the next phase.

For each straight line association, a respective swath is identified at 470 as a group of nearby detections. For each swath, the most prominent quadratic curve is separately identified at 475. In some embodiments configured for detecting multiple quadratic curves in each swath, those detections associated with the most prominent quadratic curve are removed from the swath detections being processed, resulting in modified swath detections. The next most prominent quadratic curve association of the modified swath detections is identified at 475. Those detections associated with the next most prominent quadratic curve are likewise removed, resulting in further modified swath detections. The quadratic association detection process is repeated until no more such associations are identified at 480. A minimum number of detections necessary to determine a quadratic curve association can be established (e.g., ten detections). When the next most prominent quadratic includes less than the threshold number of detections (e.g., 10), the process will proceed to the next phase.

For detections associated with each quadratic curve, a best fit is determined at 485. In at least some embodiments, the best fit is determined for three dimensional detection data, resulting in a 3-D trajectory/track. In at least some embodiments, determinations are made as to whether the detections associated with the determined 3-D trajectory can be declared ballistic or orbital at 490. Such determinations can be based on the residuals. For example, the residual can be determined as a measure of departure (e.g., a distance) of each of the one or more detections of to its respective 3-D trajectory and/or state vector. In some embodiments, residuals can be further processed, for example, by statistical measures, such as determining one or more of a respective mean, standard deviation, and the like for each associated group of detections. Determination of whether such detections are ballistic or orbital can be achieved by comparing such residuals, or statistics related to such residuals, to predetermined thresholds. In some embodiments, any such identified tracks are optionally analyzed to identify whether they are likely to belong to a common object. If so determined, the tracks are clustered at 495 (shown in phantom). Alternatively or in addition, state vectors can be determined for any such identified tracks at 498 (also shown in phantom).

FIG. 11A through FIG. 11F graphically illustrate a particular embodiment of processing an example of batch detections. Individual detections 505 obtained over an example batch period are illustrated in the initial plot 500 showing each of the detections 505 plotted at its respective relative range and time. In this example, the detections 505 have been preprocessed to reference each of the detections to a suitable ballistic model. FIG. 11B illustrates a first straight line 510 determined for a first group of linearly associated detections 505. FIG. 11C illustrates a swath boundary 515 as parallel dotted lines drawn at respective distances above and below the first straight line 510. The area defined by the swath boundary 515 has been shaded to further distinguish those detections falling within the swath.

FIG. 11D illustrates a modified plot 525 determined from the initial plot 500 (FIG. 11A) with those detections associated with the straight line 510 (FIG. 11B) removed. Such removal of already associated detections can assist in reducing double counting during subsequent processing to determine the presence of other linear associated detections. FIG. 11E illustrates a second straight line 535 determined for a second group of linearly associated detections 505 during subsequent processing of the modified batch detections 525. FIG. 11F illustrates a second swath boundary 545 as parallel dotted lines drawn at respective distances above and below the second straight line 535. The area defined by the swath boundary 545 has once again been shaded to further distinguish those detections falling within the second swath. Subsequent processing can be carried out upon a subsequently modified plot, determined as the modified plot 525 less those detections associated with the second line 535 and so forth until no additional lines are detected.

Figure 12:
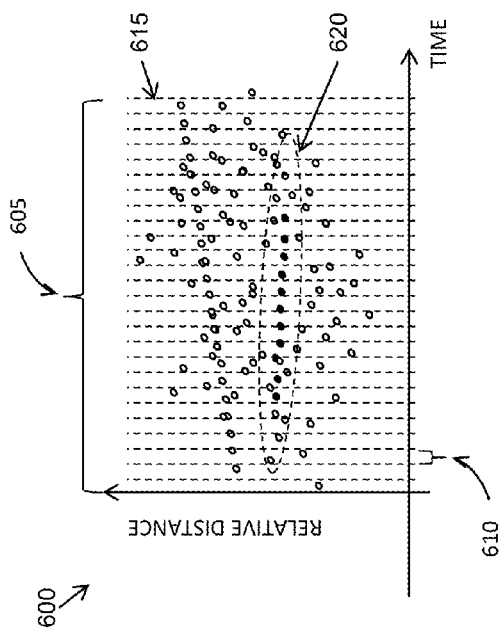
FIG. 12 illustrates a graphical representation of an example of batch detections determined from output signals of a sensor system, such as the sensor system illustrated in FIG. 1.

FIG. 12 illustrates a graphical representation of an example of batch detections 600 determined from output signals of a sensor system, such as the sensor system illustrated in FIG. 1. The batch detections are plotted according to relative distance (e.g., to a reference trajectory) versus corresponding sample time. Vertical dashed lines have been drawn to distinguish individual sweep intervals 610. The batch period 605 of this example includes all consecutive sweep intervals 610. A linear association of detections 620 is identified for the darkened circles located within the dashed oval. It is evident from inspection that these detections lay along a substantially straight line, but an ability to make such determinations from visual inspections is not necessary.

Figure 13:
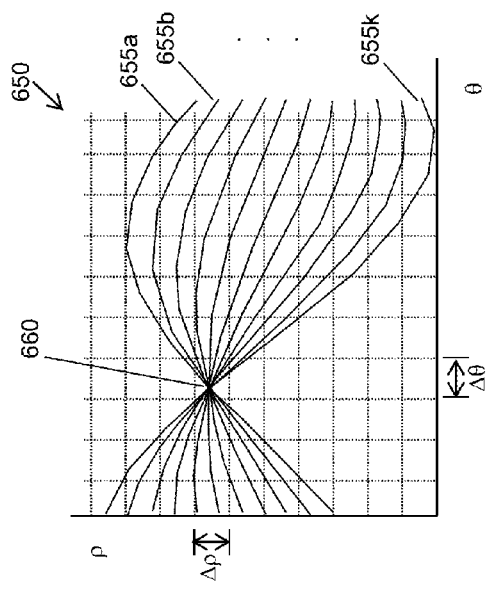
FIG. 13 illustrates a graphical representation of a particular embodiment of a Hough transformation of multiple batch detections.

FIG. 13 illustrates a graphical representation of a particular embodiment of a Hough transformation of the subset of detections 620 identified as linearly associated in FIG. 12. In particular, each detection point in the association 620 if FIG. 12 corresponds to a respective curve 655a, 655b, . . . 655k (generally 655) plotted in ρ-θ (i.e., transform) space 650 according to a linear Hough transformation. In the illustrative example, a detection point x', y' (i.e., corresponding to "relative range" and "time") can be transformed to a line in ρ-θ space 650, e.g., the top curve 655a according to the following equation:

$$\rho = x \cdot \cos\theta + y \cdot \sin\theta$$

Figure 14:
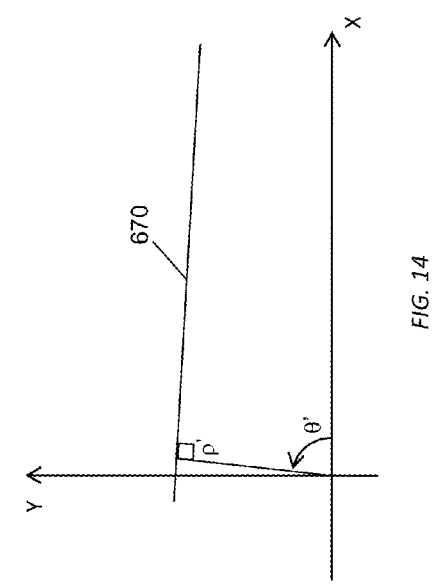
FIG. 14 illustrates a graphical representation of a particular embodiment of further processing of the Hough transformed batch detections of FIG. 13.

The transform space plot 650 includes a grid defining a granularity of Δρ along the ρ axis and Δθ along the θ axis. This can also be referred to as quantized parameter space. A particular feature of such Hough transformation of multiple detection points, is that those points that lie along a substantially straight line will result in their corresponding transformed curves intersecting at approximately the same location, which is sometimes referred to as a "knot" 660. The location of the knot 660 occurs at a particular ρ' and θ' corresponding to a straight line in x-y space. Such a straight line is identified by a perpendicular drawn to the origin forming an angle θ' from the x-axis and located at a distance ρ' measured along the perpendicular to the origin as represented by the line 670 illustrated in FIG. 14. In this example, the line 670 corresponds to the linear association 620 (FIG. 12).

Figure 15:
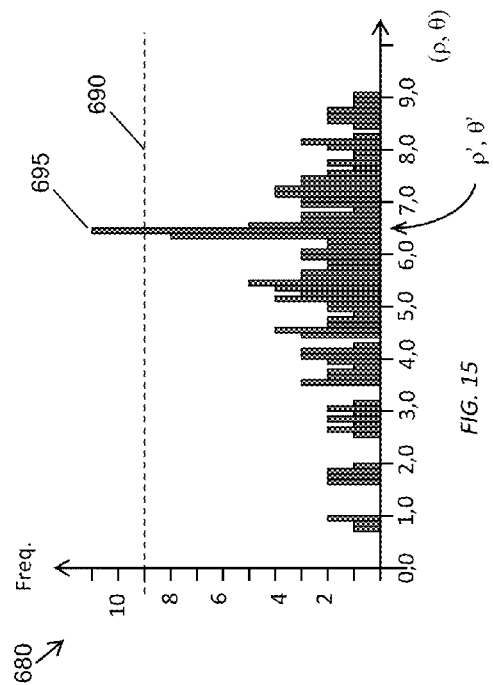
FIG. 15 illustrates an example of a line determined by Hough transformation of multiple batch detections.

Identification of a knot 660 in Hough transform space can be accomplished graphically, for example, by counting the number of curves present in each of the Δρ-Δθ cells. A cell containing a knot will have multiple curves, the precise number depending on the number of linearly associated detection points and the Δρ-Δθ resolution. FIG. 15 illustrates a graphical representation of a particular embodiment of a histogram 680 for counting the presence of curves in Δρ-Δθ cells in such a manner. The histogram calculates the frequency of curves present in each Δρ-Δθ cell. In this example, the most prominent line can be declared as the (ρ,θ) associated with the greatest occurring frequency 695. In some embodiments, a line-detection threshold 690 can be defined, such that no lines are declared if none of the frequencies surpass the threshold 690.

Alternatively or in addition, the frequencies can be counted in an accumulator array $A(\rho_i,\theta_i)$ of suitable dimension, e.g., ρ×θ, with all elements initially set to zero. For each $x_i$, $y_i$, detection point examined, the corresponding $\rho_i$, $\theta_i$ values that the point may take are determined. A '1' is added to the corresponding $A(\rho_i, \theta_i)$ position in the accumulator array, the process mathematically represented as $A(\rho_i, \theta_i) = A(\rho_i,\theta_i)+1$. Absolute maxima and relative maxima in the resulting array may represent collinear detections. The longest line in the detection plot will generally have the maximum value in the accumulator array, the frequency or value of the accumulator corresponding to the number of points associated with the straight line.

Figure 16A:
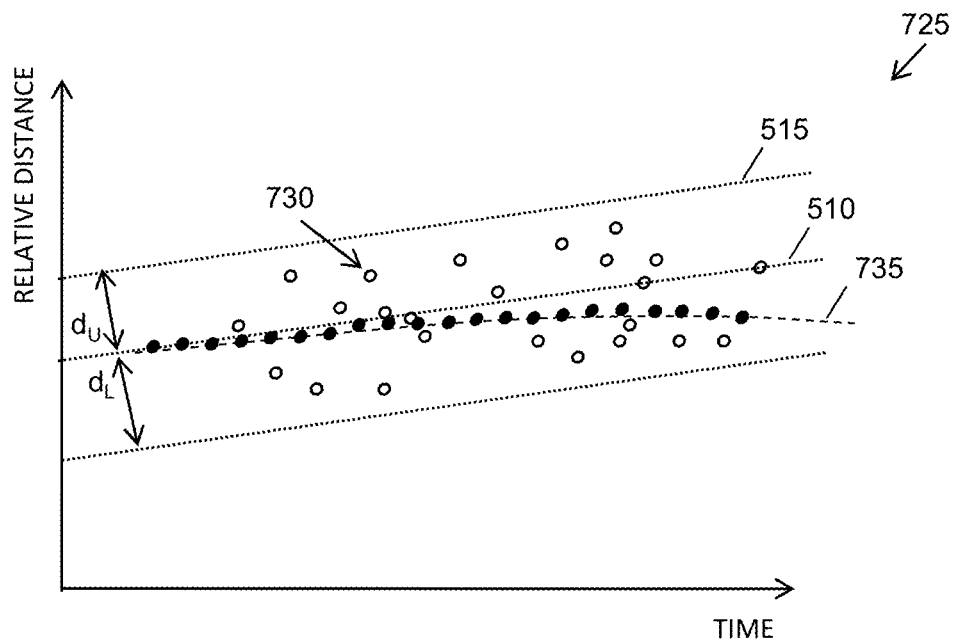
FIG. 16A and FIG. 16B graphically illustrate a particular embodiment of further processing of respective subsets of batch detections.
Figure 16B:
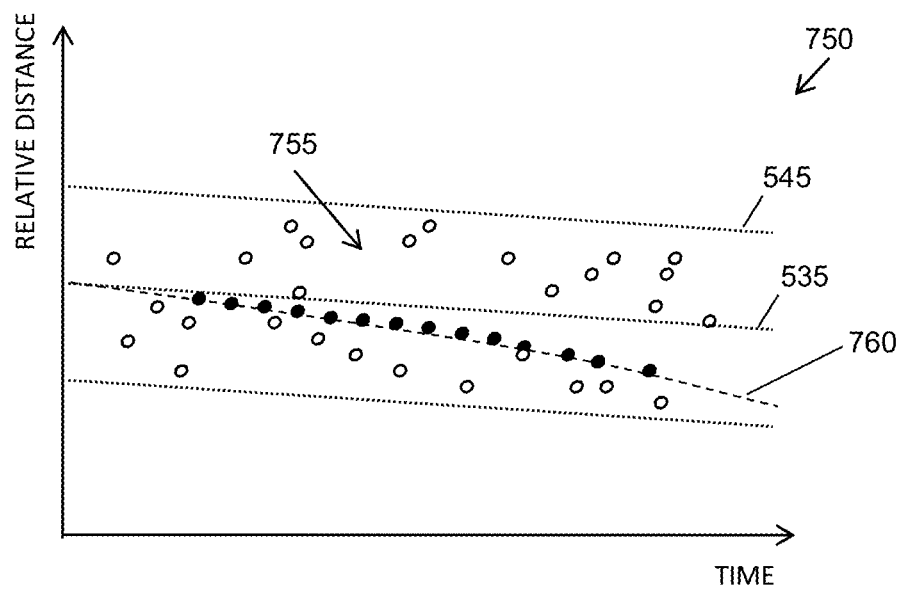

FIG. 16A and FIG. 16B graphically illustrate a particular embodiment of further processing of respective subsets of batch detections. The detections located within the first boundary 515 (FIG. 11C) are provided in the first swath plot 725, along with the original straight line approximation 510. Having reduced the number of detections to process by limiting to those detections within a swath 730, a quadratic Hough transform can be applied. In at least some embodiments, the quadratic Hough transform is applied with a finer resolution than used for the linear Hough transform. The finer resolution will be better suited for detecting subtleties in any detection associations. A resulting quadratic curve 735 is identified according to a quadratic Hough transform for quadratically associated detections. The process can be repeated for additional swaths, as illustrated in the plot 750 of FIG. 16B. The second plot 750 includes the second swath 755 defined by the second swath boundary 545 drawn about the second straight line approximation 535. Similarly, at last one second quadratic curve 760 is obtained for a second group of quadratically associated detections. Again, the resulting curve 760 can be obtained using the quadratic Hough transform, preferably with a finer resolution to detect subtle variation or departures in detections from the straight line approximation 535.

In a subsequent processing step, each group of quadratically associated detections can be de-referenced to the respective trajectory (e.g., ballistic or orbital) and enhanced to include more detail, such as the actual 3-dimensional positions. A nonlinear curve is fit to the resulting 3-D data set, as described above, corresponding to a trajectory of a detected object.

Figure 17A:
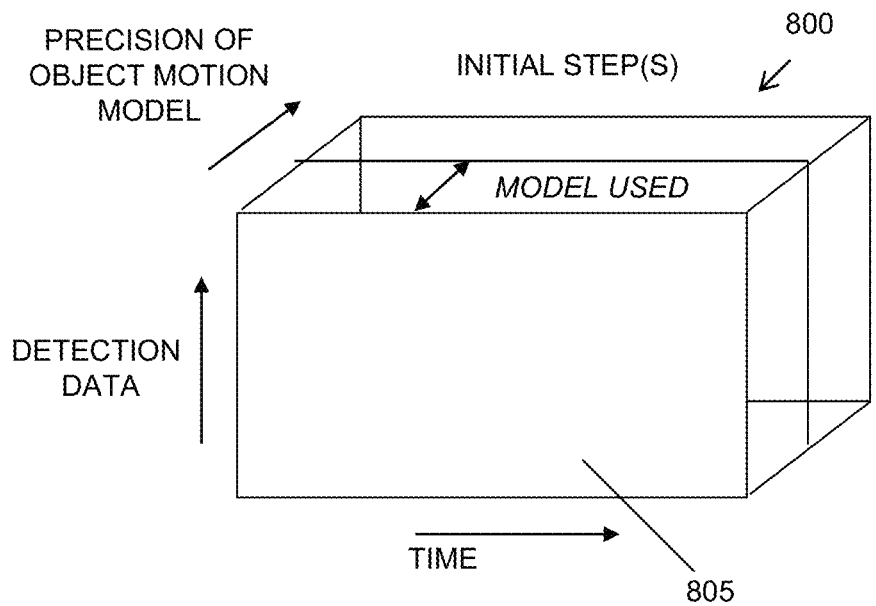
FIG. 17A and FIG. 17B graphically illustrate a particular embodiment of an approach for simultaneously processing batch detections.
Figure 17B:
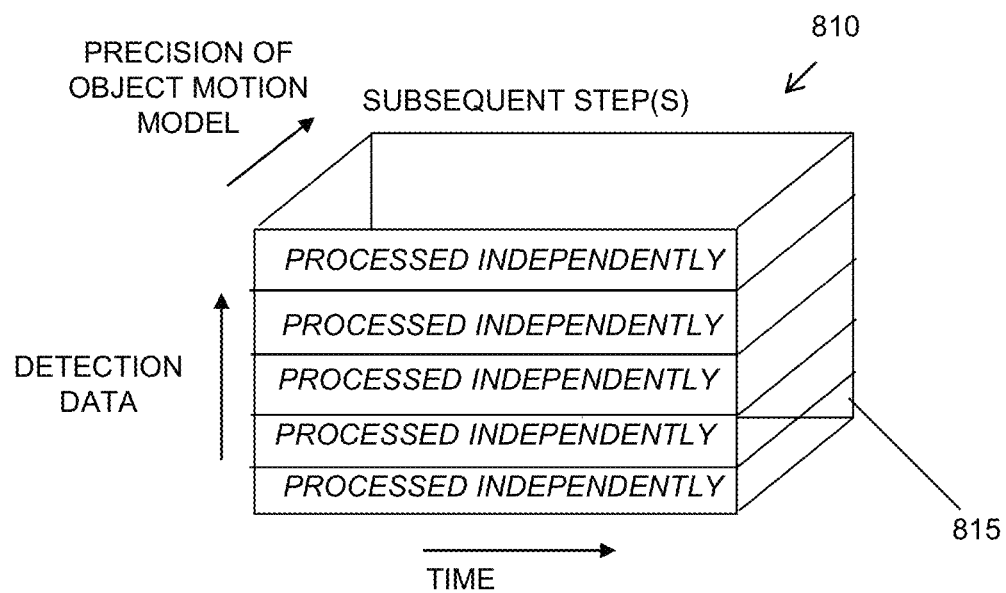

Computation requirements for the processing of batch associations generally increases according to increases in one or more of: the length of the batch period; the amount of detection data considered in any computations; the precision of any related motion models; and the complexity of measurement data as may be associated with each detection. FIG. 17A and FIG. 17B graphically illustrate a particular embodiment of how the various parameters can be managed according to the batch detection processes described herein. Each of the figures includes a cube drawn on three orthogonal axes. A horizontal axis represents time, with increasing time in the direction of the arrow. A vertical axis represents detection data, with the volume of detection data (i.e., more points) increasing in the direction of the arrow. A third orthogonal axis, drawn at an angle, signifying a direction into the page, represents precision of an object of motion model, with precision increasing in the direction of the arrow. A fourth parameter, the actual measurement date used, is not depicted in the figures.

The batch detection process, such as the examples described herein, are distinguishable from other tracking algorithms at least by their approach of managing division and allocation of the various computational parameters. In particular, the approaches described herein allow for processing an entire batch of detections substantially simultaneously with available computing resources in reasonable period of time. This is captured in the cube of FIG. 17A, defining a first volume extending for the entire batch period and for all detections available within the batch period. Only limited precision, however, is considered for object motion. This volume is represented by a front portion 805 of the cube 800. This distribution of complexity represents the initial phases of processing described above in which a linear Hough transform was carried out for all detections within the batch period. The Hough transform identifies straight lines, thereby approximating what is likely complex object motion (e.g., ballistic or elliptical) by a straight line.

FIG. 17B illustrates how the computation parameters are redistributed during subsequent phases of the batch detection process described herein. As shown, the volume of the cube 810 can be redistributed into a number of horizontal slices 815. Each slice extends for an increased precision of object motion, once again for the entire batch period, but only for a subset of the detection data. For example, subsequent determination of quadratic associations for each swath represents a greater precision than the linear approximation performed for the entire batch. The detections, however, are limited according to swaths such that computation of quadratic curves can be accomplished separately for each swath. In some embodiments, such separate computation can be accomplished simultaneously and in parallel, for example, to expedite determination of tracks for a given batch detection.

Additionally, subsequent phases of the process can be accomplished in a similar manner as shown in the configuration illustrated in FIG. 17B. Namely, an increased precision represented by a nonlinear curve fitting of full 3-D data is accomplished for a subset of detections, such as those detections associated along a common quadratic line. Determination of the best fit can accomplished for the reduced set of detections over an entire batch interval. The above process is readily distinguishable from traditional track processors that operate on only a very limited portion of detection data, continuously updating and refining track estimates over subsequent detections, for example, over a batch detection period.

Additionally, determination of extracted tracks can be a function of various threshold parameters, such as a minimum number of detections required to declare presence of a swath (e.g., the minimum number of detections to determine a linear association). Another threshold parameter can be a minimum number of detections required to declare presence of a non-straight line (e.g., quadratic) track in a swath. Other threshold parameters include a minimum radar cross section below which no detection is declared, and residual threshold in batch nonlinear least squares fit, to declare presence of a ballistic track. Still further threshold parameters relate to clustering tracks for the same object (e.g., two tracks falling within a threshold separation distance). One or more of the various parameters can be selected and/or varied, for example, according to availability of computational resources (e.g., a relatively high RCS threshold to limit the number of batch detections).

Generally, batch detection data as described herein is obtained from a single sensor. In some embodiments, batch detection data of the same objects may be obtained from multiple sensors. In such a scenario, individual batch detections for each respective sensor would be processed separately. Results obtained from such processing of data from multiple sensors can be combined during post processing, for example, to further enhance reliability of results, refine trajectories, etc.

The batch detection processor 320 (FIG. 6) and 365, 370 (FIG. 9), as a whole or any of the various modules described in association therewith 325, 330, 335, 340, 345, 355, 350 (FIG. 8), 365, 370 (FIG. 9) may represent or include any form of processing component, including general purpose computers, dedicated microprocessors, or other processing devices capable of processing electronic information. Examples of such processors include digital signal processors (DSPs), application-specific integrated circuits (ASICs), field-programmable gate arrays (FPGAs), and any other suitable specific- or general-purpose processors. Although FIG. 6 illustrates a particular embodiment of the batch detection processor 320 as a single processor, the processor may include any suitable number of processors. Likewise, individual processors as may be used to process batch detections in parallel (e.g., second batch processors 370 (FIG. 9)), may also include a single processor or any suitable number of processors.

Each of the one or more processors may include or otherwise access memory (not shown) configured to store processor instructions that at least one representation of the batch detection processor 320, 365, 370 may utilize during operation. In particular embodiments, a memory, such as the batch data storage 315, may also store detections received from the sensor 310 for subsequent analysis. The first and second memories, including the batch data storage 315 may include any collection and arrangement of volatile or non-volatile components suitable for storing data. For example, such memories may comprise random access memory (RAM) devices, read-only memory (ROM) devices, magnetic storage devices, optical storage devices, or any other suitable data storage devices. In particular embodiments, such memories may represent, in part, computer-readable storage media on which computer instructions and/or logic are encoded. In such embodiments, some or all the described functionality of the batch detection processor 320 may be provided by the batch detection processor 320 executing the instructions encoded on the described media. Although shown in FIG. 6 and FIG. 9 as single components, the batch data storage 315 may represent any number of memory elements within, local to or accessible by the batch detection processor 320.

In at least some embodiments, the systems and processes described herein are implemented in real-time applications. As such, potentially large volumes of information must be processed in relatively short periods of time (e.g., between successive sensor batch update reports). At least one approach to facilitate processing speed is division of processing tasks among the various system components. In such embodiments, batch detections obtained for a first batch period may be processed while subsequent batch detections are obtained for subsequent batch periods.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Procedural steps can be performed by one or more programmable processors executing a computer program to perform functions of the invention by operating on input data and generating output. Procedural steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission, such as transfer of batch detection data and resulting tracks, or object state vectors, and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computing devices and having a client-server relationship to each other.

Communication networks can include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., MICROSOFT® INTERNET EXPLORER® available from Microsoft Corporation, MOZILLA® FIREFOX® available from Mozilla Corporation, and SAFARI® available from Apple Corporation). The mobile computing device includes, for example, a BLACKBERRY®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method executed by one or more processors for tracking a set of moving targets, comprising:
receiving a plurality of detections obtained during a surveillance period from at least one sensor monitoring at least one target moving along a respective discernable trajectory;
identifying a respective linear approximation of at least one of the respective discernable trajectories;
associating a respective first subset of the plurality of detections with each of the respective linear approximations;
identifying a respective swath of detections around at least one of the respective linear approximations, wherein the respective swath of detections are within an upper and lower boundary of the at least one of the respective linear approximations, and wherein the respective swath of detections are obtained over an entire set of time steps consisting of all of the plurality of detections in the surveillance period;
identifying for each of the associated first subsets and the respective swath of detections, a respective a quadratic approximation of the respective discernable trajectory; and associating further, for each of the associated first subsets, a respective second subset of the plurality of detections with each of the respective quadratic approximations.

2. The method of claim 1, wherein identifying each respective linear approximation comprises applying a linear Hough transformation to at least some of the plurality of detections.

3. The method of claim 2, wherein identifying each respective quadratic approximation comprises applying a quadratic Hough transformation to at least some of the plurality of detections.

4. The method of claim 1, wherein associating each respective first subset of the plurality of detections with each respective linear approximation comprises identifying detections within a predetermined Euclidian distance to the linear approximation.

5. The method of claim 1, wherein associating further each respective first subset of the plurality of detections with each respective quadratic approximation comprises applying a least-squares fit.

6. The method of claim 1, wherein the respective discernable trajectory is a ballistic trajectory.

7. The method of claim 1, wherein the respective discernable trajectory is an orbital trajectory.

8. The method of claim 1, further comprising associating for each of the respective second subsets a respective target.

9. The method of claim 1, further comprising generating at least one respective state vector for each quadratic approximation of each discernable trajectory.

10. An apparatus configured to track a set of moving targets, comprising:
a memory configured to store a plurality of detections obtained during a surveillance period from at least one sensor monitoring at least one target moving along a respective discernable trajectory;
a first identification module in communication with the memory, using one or more processors, configured to identify a respective linear approximation of each of the respective discernable trajectories;
a first association module in communication with the memory and the first identification module, using one or more processors, configured to associate a respective first subset of the plurality of detections with each of the respective linear approximations;
a swath generation module in communication with the first identification module configured to identify a respective swath of detections around at least one of the respective linear approximations, wherein the respective swath of detections are within an upper and lower boundary of the at least one of the respective linear approximations, and wherein the respective swath of detections are obtained over an entire set of time steps consisting of all of the plurality of detections in the surveillance period;
a second identification module in communication with the first association model, using one or more processors, configured to identify for each of the first subsets and the respective swath of detections, a respective a quadratic approximation of the respective discernable trajectory; and
a second association module in communication with the memory and the second identification module, using one or more processors, configured to associate further, for each of the associated first subsets of the plurality of detections, a respective second subset of the plurality of detections with each of the respective quadratic approximations.

11. The apparatus of claim 10, further comprising a tracking module configured to generate at least one respective state vector for each quadratic approximation of each discernable trajectory.

12. The apparatus of claim 10, wherein the first identification module comprises a linear Hough transform processor.

13. The apparatus of claim 10, wherein the second identification module comprises a quadratic Hough transform processor.

14. The apparatus of claim 10, wherein the second association module comprises a non-linear, least-squares processor configured to fit detections to each respective quadratic approximation.

15. The apparatus of claim 10, further comprising a grouping module in communication with the second association module, configured to further associate one or more second subsets of the plurality of detections with a common target.

16. The apparatus of claim 10, wherein the second identification module comprises a plurality of sub-identification modules, each sub-identification module configured to identify for a respective associated subset of the plurality of detections, a respective a quadratic approximation of each respective discernable trajectory.

17. The apparatus of claim 10, wherein the second association module comprises a plurality of sub-association modules, each sub-association module configured to identify for each associated subset of the plurality of detections, a respective second subset of the plurality of detections with each respective quadratic approximation.

18. An apparatus for tracking a set of moving targets, comprising:
means for receiving a plurality of detections obtained during a surveillance period from at least one sensor monitoring at least one target moving along a respective discernable trajectory;
means for identifying a respective linear approximation of at least one of the respective discernable trajectories;
means for associating a respective first subset of the plurality of detections with each of the respective linear approximations;
means for identifying a respective swath of detections around at least one of the respective linear approximations, wherein the respective swath of detections are within an upper and lower boundary of the at least one of the respective linear approximations, and wherein the respective swath of detections are obtained over an entire set of time steps consisting of all of the plurality of detections in the surveillance period;
means for identifying for each of the associated first subsets and the respective swath of detections, a respective a quadratic approximation of the respective discernable trajectory; and
means for associating further, for each of the associated first subsets, a respective second subset of the plurality of detections with each of the respective quadratic approximations.

* * * * *